US007076096B2

(12) United States Patent
Kunimasa et al.

(10) Patent No.: US 7,076,096 B2
(45) Date of Patent: Jul. 11, 2006

(54) RECOGNIZING A PRINT INHIBIT IMAGE PATTERN USING IMAGE DATA CONVERTED FOR FAST RECOGNITION

(75) Inventors: Takeshi Kunimasa, Ebina (JP); Toru Hada, Ebina (JP); Kenichi Ishida, Ebina (JP); Masao Morita, Ebina (JP); Yozo Yamaguchi, Ebina (JP); Masami Kurata, Ebina (JP); Hiroshi Sekine, Ebina (JP); Hiroyuki Kawano, Ebina (JP); Takanobu Otsubo, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 593 days.

(21) Appl. No.: 09/842,182

(22) Filed: Apr. 26, 2001

(65) Prior Publication Data

US 2001/0036315 A1    Nov. 1, 2001

(30) Foreign Application Priority Data

Apr. 27, 2000   (JP) ............................. 2000-128485

(51) Int. Cl.
    *G06K 9/00* (2006.01)
(52) U.S. Cl. ...................................... 382/181; 382/190
(58) Field of Classification Search ................ 382/181,
        382/203, 190, 218, 224, 164, 165, 170, 171,
                              382/173; 358/1.14, 1.2, 464
    See application file for complete search history.

(56) References Cited

U.S. PATENT DOCUMENTS

| 6,538,759 | B1* | 3/2003 | Hiraishi et al. ............. 358/1.14 |
| 6,594,034 | B1* | 7/2003 | Bloomquist et al. ........ 358/1.18 |
| 2002/0009229 | A1* | 1/2002 | Fu et al. ....................... 382/199 |

FOREIGN PATENT DOCUMENTS

| JP | 5-12411 | 1/1993 |
| JP | 6-54186 | 2/1994 |
| JP | 06-225134 | 8/1994 |
| JP | 6-225134 | 8/1994 |
| JP | 7-288681 | 10/1995 |
| JP | 8-335267 | 12/1996 |
| JP | 9-16044 | 1/1997 |
| JP | 9-18709 | 1/1997 |
| JP | 11-103383 | 4/1999 |

FOREIGN PATENT DOCUMENTS

| JP | 11-316839 | 11/1999 |
| JP | 2000-103141 | 4/2000 |

* cited by examiner

*Primary Examiner*—Yon J. Couso
(74) *Attorney, Agent, or Firm*—Morgan, Lewis Bockius, LLP

(57) ABSTRACT

Disclosed is an image processing device capable of recognizing a specific image such as an image which is prohibited from printing at high speed and, moreover, without being influenced by an image forming process. A drawing command analysis unit analyzes a drawing command received by a drawing command input unit and sends an analysis result to both an output image data generation unit and a recognition image data generation unit. The output image data generation unit generates output image data adapted to an image formation device in accordance with the drawing command. In parallel with the operation, the recognition image data generation unit generates recognition image data adapted to a recognition unit in accordance with the drawing command. The recognition unit performs a process of recognizing a specific image by using the recognition image data. The recognition image data may have a data format, resolution, a color space, and the number of bits per pixel which are different from those of the output image data. When the specific image is recognized by the recognition unit, the output image data generation unit stops outputting the output image data.

18 Claims, 6 Drawing Sheets

(a, b) lineto
(b, c) lineto
(c, d) lineto
(d, e) lineto
closepath
(color) fill

(BLANK PAPER)

FIG.5B

PRINTING PROHIBITED

RECOGNIZING A PRINT INHIBIT IMAGE PATTERN USING IMAGE DATA CONVERTED FOR FAST RECOGNITION

BACKGROUND OF THE INVENTION

1. Field of the Invention

The present invention relates to an image processing device having the function of recognizing a specific image, an image processing method, and a storage medium in which a program implementing such a function is stored.

2. Description of the Related Art

In recent years, higher picture quality of a color copier and a printer, and higher performance of a personal computer, higher picture quality of a scanner, and the like are being realized, and a printed matter of high picture quality can be relatively easily formed. It accordingly causes a problem that securities such as paper money and various tickets which are prohibited from reproduction can be illegally reproduced by using those devices.

Aiming at mainly prohibiting such illegal reproduction, various methods of recognizing an image which is prohibited from printing by a digital image processing technique have been proposed in literatures such as Japanese Published Unexamined Patent Application Nos. Hei-6-54186, Hei-6-225134, Hei-8-335267, and Hei-9-18709. Usually, according to the techniques, a raster image is received as an input and an image prohibited from printing which exists in the raster image is recognized. Such a recognition method is convenient for a copier and the like since a read image is supplied as a raster image.

In the case of forming an image by a printer or the like, however, input image data is, for example, a drawing command and image data described in a page description language. There is consequently a problem such that the recognition method for a raster image cannot be applied as it is.

Although a raster image is created by a printer when an image is finally formed, in the case where the raster image is used for a recognition process, the created raster image cannot be outputted (formation of an image) until the recognition process is finished. It is therefore a problem that time required to form an image is long. For example, when the recognition process is performed on a raster image for printing of one page, time of ten and several to several tens seconds is required. Such long time for the recognition process is not allowed to be taken during the period from generation to output of the raster image in a higher-speed outputting device in recent years. Moreover, the resolution of an outputting apparatus is being improved and the data amount of the raster image created at the time of forming an image is increasing. The recognition process tends to take longer time as the data amount increases. It is feared that the recognition process time becomes longer as the resolution improves.

SUMMARY OF THE INVENTION

In view of the problems noted above, the present invention provides an image processing device and an image processing method capable of recognizing a specific image such as an image which is prohibited from printing at high speed without being influenced by a process of forming an image, and a storage medium in which a program for allowing a computer to execute such an image processing method is stored and which can be read by a computer.

According to the invention, output image data is generated from input image data, recognition image data for recognizing a specific image is generated from the same image data, and a process of recognizing the specific image is performed by using the generated recognition image data. By performing the generation of the output image data and the recognition process in parallel as described above, the time necessary only for the recognition process is shortened or eliminated. Thus, a high-speed image process can be implemented.

The output image data is image data adapted to an image formation unit or the like as a destination. By separately generating the recognition image data, image data optimum to the recognition process can be generated, and the process of recognizing the specific image can be carried out by using the optimum image data. For example, when the page description language format is required for the output image data and a raster image format is required for the recognition process, the output image data and the recognition image data may be generated in respective formats satisfying the requirements. The invention can also be applied to the case where requested color spaces are different in such a manner that image data in the YMCK color space is required as output image data, and image data in the RGB color space is required for the recognition process. Further, there is a case such that high resolution is not necessary for recognizing the specific image in the recognition process. There is also a case where a large gradation scale is not necessary. In such cases, image data having resolution or the number of bits different from that of output image data can be generated as the recognition image data. Consequently, the process of recognizing a specific image can be performed at higher speed as compared with the case of using, for example, image data for forming an image.

There is also a case of performing a process per partial image like a case of outputting output image data per partial image. In such a case, generation of the output image data and conversion to the recognition image data are performed per partial image, and the operation of recognizing the specific image is performed on the recognition image data of each partial image. When the possibility that the specific image is included is equal to or higher than a predetermined value, the operation of recognizing the specific image is performed on the partial image together with another partial image. In such a manner, for example, in the case of outputting output image data per partial image, while outputting the output image data per partial image, the process of recognizing the specific image can be performed. When the possibility that the specific image is included increases, the process of recognizing the specific image is performed not only on the partial image but also on another partial image, thereby enabling the recognition process to be performed with higher precision.

When the process of recognizing the specific image is performed as described above and the existence of the specific image is determined, the generation or outputting of the output image data is stopped, a message of the existence of the specific image is outputted, or an image process is performed so that the image cannot be recognized as the specific image and the resultant image is outputted.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
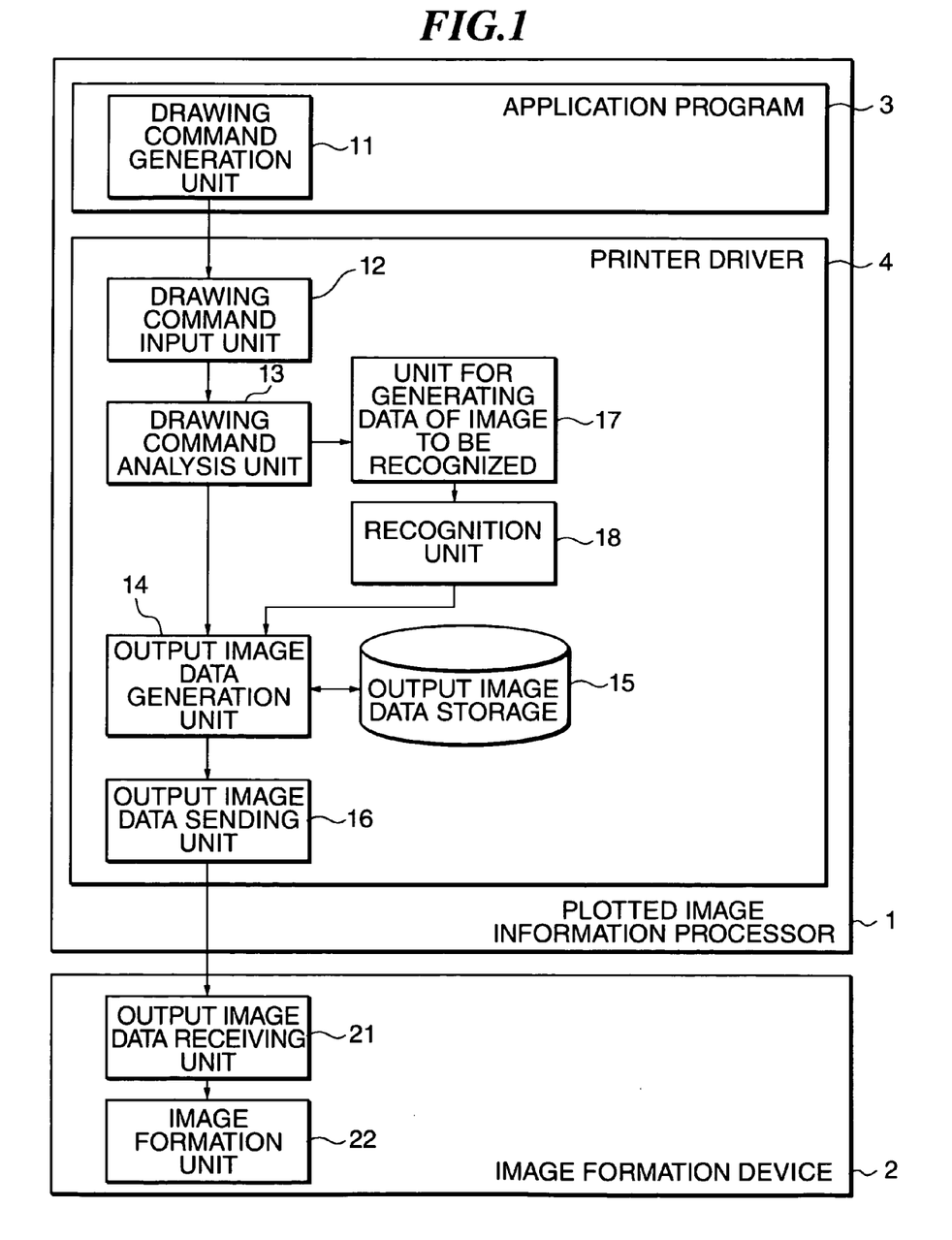
FIG. 1 is a block diagram showing an example of an image forming system including an embodiment of the invention.

FIG. 1 is a block diagram showing an example of an image processing system including an embodiment of the invention. Shown in FIG. 1 are a plotted image processor 1, an image formation device 2, an application program 3, a printer driver 4, a drawing command generation unit 11, a drawing command input unit 12, a drawing command analysis unit 13, an output image data generation unit 14, an output image data storage 15, an output image data sending unit 16, a unit 17 for generating data of an image to be recognized (hereinbelow, referred to as recognition image data generation unit), a recognition unit 18, an output image data receiving unit 21, and an image formation unit 22. In the example, the image processing system of the invention is provided in the printer driver 4 in the plotted image processor 1.

The plotted image processor 1 generates output image data to be printed by the image formation device 2 and outputs the output image data to the image formation device 2 via a network such as LAN or public line, a cable, or the like. The image formation device 2 which has received the output image data forms an image on a recording sheet or the like in accordance with the output image data.

In the plotted image processor 1, various application programs 3 operate and the printer driver 4 for generating and outputting output image data to the image formation device 2 is provided. When a request of image formation is generated in the application program 3, the drawing command generation unit 11 generates a drawing command and transfers the drawing command to the printer driver 4 directly or via an OS or the like.

The drawing command input unit 12 in the printer driver 4 receives the drawing command generated by the drawing command generation unit 11 in the application program 3 and transfers it to the drawing command analysis unit 13. The drawing command analysis unit 13 analyzes the drawing command and transfers the result of analyzing the drawing command to the output image data generation unit 14 and the recognition image data generation unit 17.

The output image data generation unit 14 generates output image data adapted to the image formation device 2 in accordance with the analysis result of the drawing command in the drawing command analysis unit 13. The generated output image data can be stored in the output image data storage 15 in the example. As the output image data generated by the output image data generation unit 14, for example, image data described in the PDL, a raster image, or the like can be used according to the image formation device 2. The output image data generated by the output image data generation unit 14 is transmitted from the output image data sending unit 16 to the image formation device 2.

The recognition image data generation unit 17 generates data of an image to be recognized (hereinbelow, called recognition image data) which is adapted to the recognition unit 18 in accordance with the result of analyzing the drawing command in the drawing command analysis unit 13. The process of generating the recognition image data by the recognition image data generation unit 17 can be performed in parallel with the process of generating output image data in the output image data generation unit 14. Since the recognition image data is generated separately from the output image data, for example, recognition image data which is not adapted to the image formation device 2 but is adapted to the recognition unit 18 can be generated. For instance, when the output image data generation unit 14 generates output image data described in the PDL, a raster image can be generated as recognition image data. When the output image data generation unit 14 generates output image data in the YMCK color space in accordance with the image formation device 2, recognition image data in the RGB color space can be generated. Further, recognition image data having resolution, size, the number of bits per pixel, and the like which are optimum to the recognition process in the recognition unit 18 can be generated.

The recognition unit 18 recognizes a specific image from the recognition image data sent from the recognition image data generation unit 17. When a specific image is recognized in the recognition image data, the fact is notified to the output image data generation unit 14 and the output image data generation unit 14 is allowed to execute a process which is performed when the specific image exists. As the recognition method, an arbitrary known method can be used.

The image formation device 2 has the output image data receiving unit 21 and the image formation unit 22. The output image data sent from the plotted image processor 1 is received by the output image data receiving unit 21 and an image is formed on a sheet of paper or the like by the image formation unit 22 in accordance with the output image data.

Figure 2:
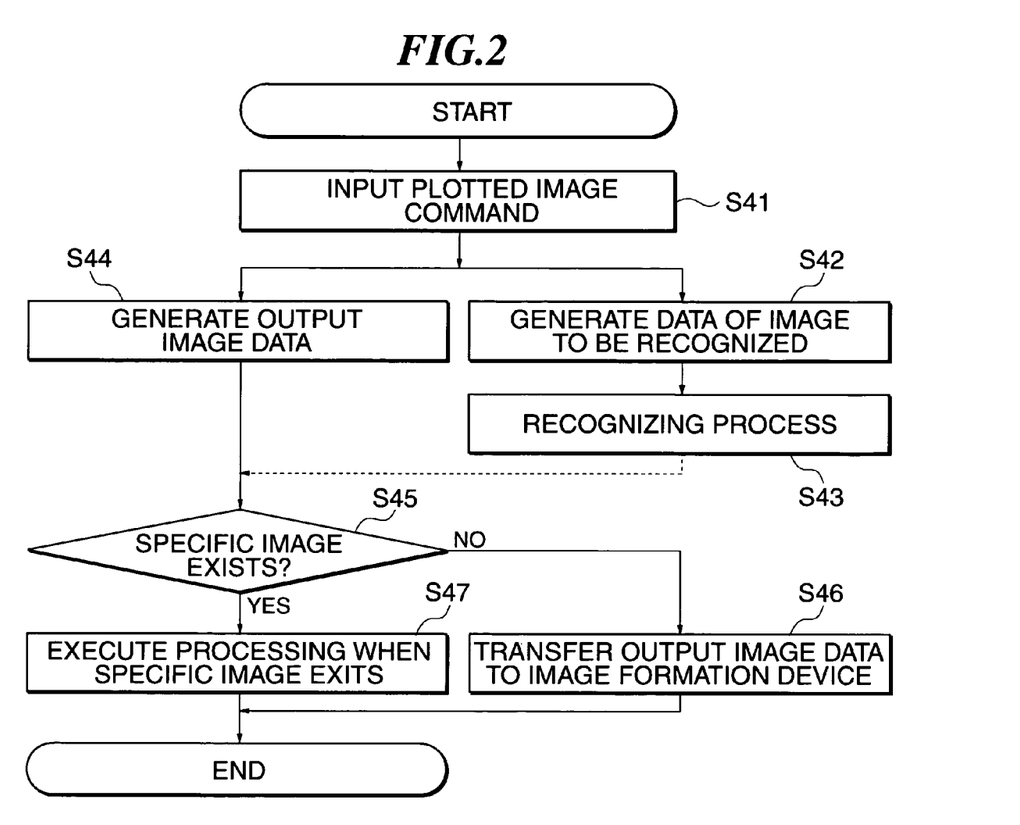
FIG. 2 is a flowchart showing an example of operations of mainly a printer driver in the example of the image forming system including the embodiment of the invention.

FIG. 2 is a flowchart showing an example of the operations of mainly a printer driver in the example of the image forming system including an embodiment of the invention. When a drawing command generated by the drawing command generation unit 11 is sent, in step S41, it is received by the drawing command input unit 12 and analyzed by the drawing command analysis unit 13. After that, the drawing command is transferred to both the output image data generation unit 14 and the recognition image data generation unit 17.

The output image data generation unit 14 and the recognition image data generation unit 17 operate in parallel. In step S42, the recognition image data generation unit 17 generates recognition image data adapted to the recognition unit 18 and transfers the data to the recognition unit 18. In step S43, the recognition unit 18 performs an operation of recognizing a specific image from the recognition image data. When the specific image is not recognized, the process on the recognition image data sent from the recognition image data generation unit 17 is finished. In this case, the result that the specific image is not recognized is notified to the output image data generation unit 14. When the specific image is recognized, the fact is notified to the output image data generation unit 14.

On the other hand, in parallel with the process of generating the recognition image data in the recognition image data generation unit 17, the output image data generation unit 14 performs a process of generating output image data adapted to the image formation device 2 in step S44. After completion of the process of generating the output image data, the output image data generation unit 14 receives the recognition result from the recognition unit 18. When the recognition process in the recognition unit 18 has not been finished at this time point, the output image data generation unit 14 waits until the recognition process is finished.

In step S45, the result of recognition from the recognition unit 18 is determined. For example, when the recognition result that the specific image has not been recognized is obtained, in step S46, the output image data is transferred to the image formation device 2. When the result of recognition that the specific image has been recognized is obtained, in step S47, the process which is performed when the specific image exists is carried out. As the process performed when the specific image exists, for example, the output of the output image data is stopped, output image data is outputted to form an image such that a whole page is blank or that predetermined patterns are overlapped, or output image data including a character train of a message indicative of the specific image such as "printing is forbidden" can be generated.

Although the recognition result from the recognition unit 18 is determined after completion of the generation of the output image data in the above description, for example, the recognition result from the recognition unit 18 may always be monitored during the process of generating output image data or the recognition result may be received by an interruption or the like from the recognition unit 18. For example, when the existence of the specific image is recognized during the process of generating the output image data, the regular process of generating the output image data is stopped at that time point, and the program can shift to the process which is performed when the specific image exists.

In such a manner, the recognition image data for recognizing the specific image by the recognition unit 18 is generated separately from the output image data to be outputted to the image formation device 2. Consequently, irrespective of the parameters of the image formation device 2, the image data requested by the recognition unit 18 is transmitted to the recognition unit 18 and the accurate recognition process using the optimum image data can be performed. Since the process of generating the recognition image data can be performed in parallel with the process of generating the output image data, the whole process does not become slow due to the process of generating the recognition image data. Further, since the recognition process is also performed in parallel with the process of generating the output image data, the processing speed of the whole system does not drop due to the recognition process. For example, when the recognition unit 18 can recognize the specific image even from a low-resolution image, it is sufficient to generate an image of which resolution is lower than that of an image at the time of image formation as recognition image data and perform the recognition process. Depending on the recognition image data, the recognition process can be performed at higher speed.

Figure 3:
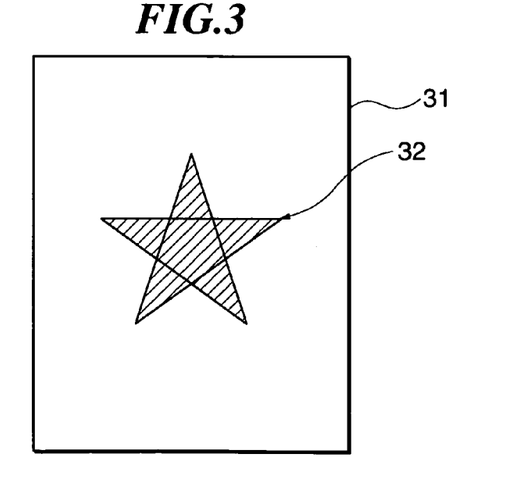
FIG. 3 is an explanatory diagram showing a specific example of an image to be formed by a drawing command.
Figure 4A:
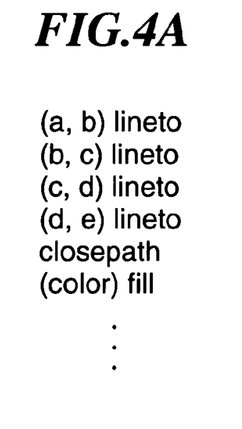
FIGS. 4A and 4B are explanatory diagrams showing an example of output image data and data of an image to be recognized.
Figure 4B:
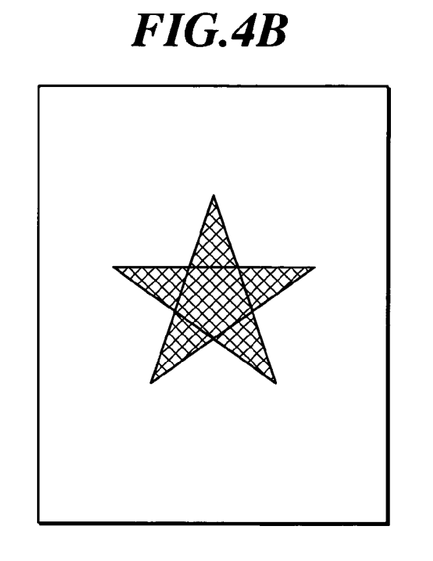
Figure 5A:
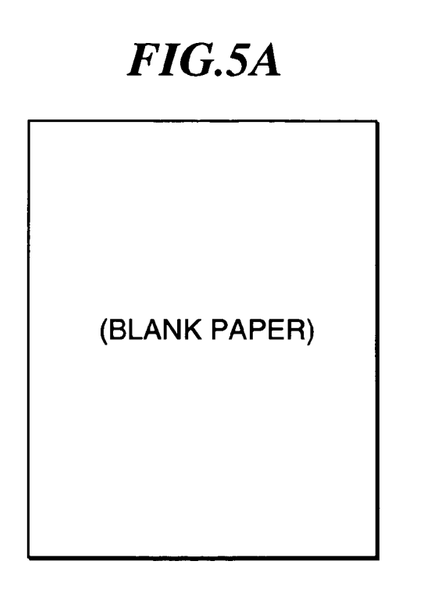
FIGS. 5A and 5B are explanatory diagrams of specific examples of an image formed in the case where a specific image is included.
Figure 5B:
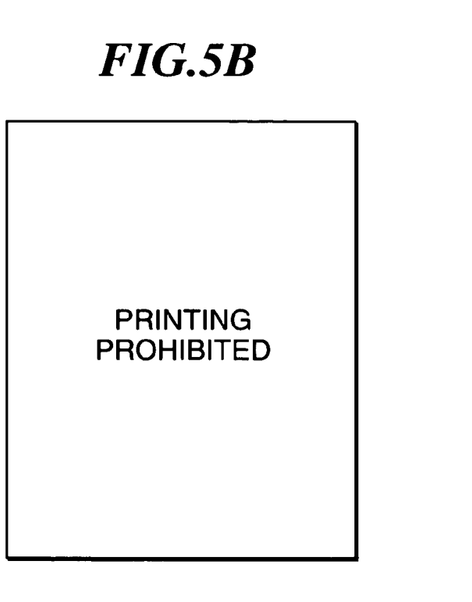

The operation will be described hereinbelow on the basis of the specific example. FIG. 3 is an explanatory diagram of a specific example of an image to be formed by the drawing command. FIGS. 4A and 4B are explanatory diagrams of an example of output image data and recognition image data. FIGS. 5A and 5B are explanatory diagrams of a specific example of an image which is formed when the specific image is included. In FIG. 3, reference numerals 31 and 32 are an image and a specific image, respectively. It is assumed that a drawing command to form the image 31 as shown in FIG. 3 is generated and the star figure shown in FIG. 3 is the specific image 32.

The drawing command analysis unit 13 receives the drawing command to draw such a star, analyzes it, and transfers it to both the output image data generation unit 14 and the recognition image data generation unit 17. It is assumed that output image data described in the PDL is generated in this case, so that the output image data generation unit 14 generates, for example, output image data as shown in FIG. 4A.

On the other hand, the recognition image data generation unit 17 generates, for example, a raster image as shown in FIG. 4B from the drawing command and sends the raster image to the recognition unit 18. The recognition image data may be different from the raster image formed by the image formation device 2 and is formed as an image optimum to the recognition process in the recognition unit 18. For example, parameters such as resolution, color space, gradation, and the like are set according to the recognition process. When an image format other than the raster format is required by the recognition unit 18, obviously, image data in the requested format is generated.

The recognition image data generated as described above is sent to the recognition unit 18 where the process of recognizing the specific image is performed. Since the drawing command to draw the specific image is transmitted in the example, the existence of the specific image is recognized by the recognition unit 18. The result of recognition that the specific image exists is sent to the output image data generation unit 14. In accordance with the result of recognition, the output image data generation unit 14 executes the process which is performed when the specific image exists.

As the process performed when the specific image exists, for example, the whole page is made blank as shown in FIG. 5A or a message of "printing is forbidden" can be formed as shown in FIG. 5B. When information such as the position of the specific image is sent from the recognition unit 18, on the basis of the information such as the position, an area where the specific image exists is made blank, an image process of, for example, overlapping a predetermined pattern is performed to process the image so as not to be seen as the specific image, or a message such that "printing is forbidden" can be inserted in the area. The operation itself of generating or outputting the output image data may be stopped.

Figure 6:
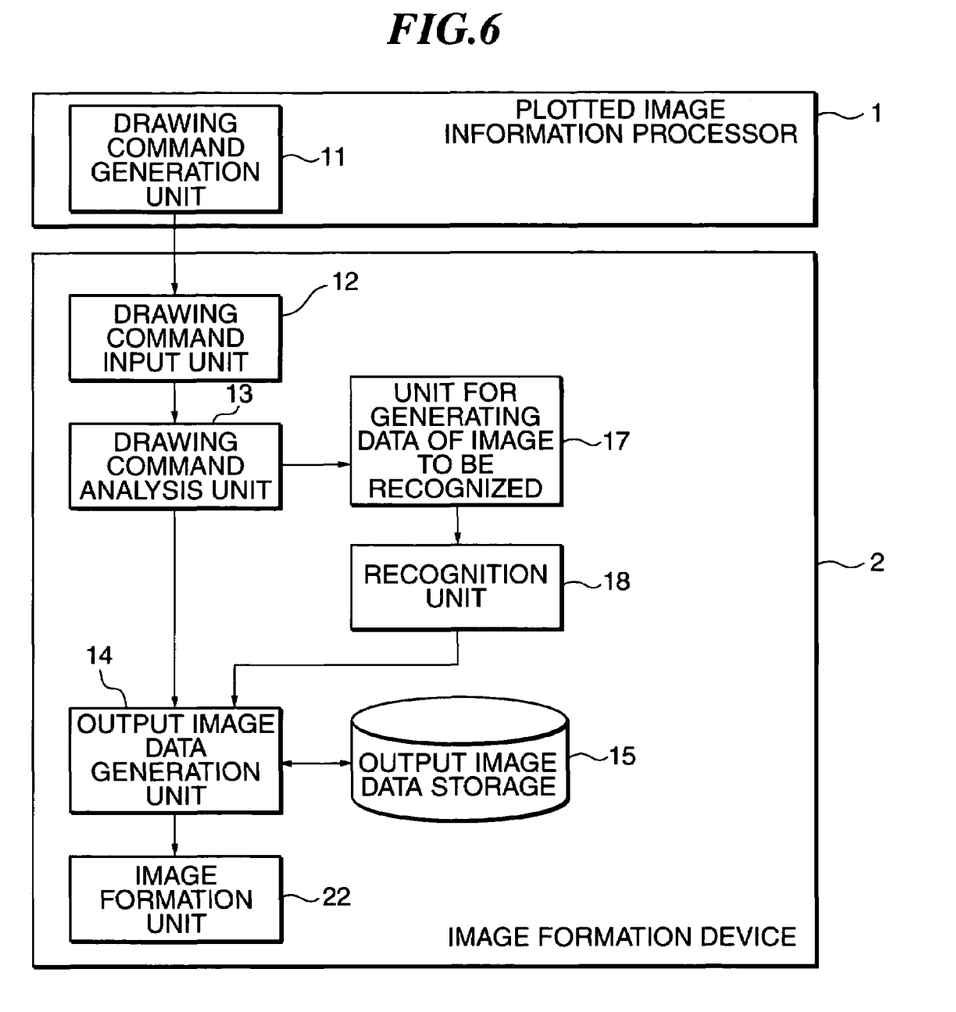
FIG. 6 is a block diagram showing another example of the image forming system including an embodiment of the invention.

FIG. 6 is a block diagram showing another example of the image forming system including an embodiment of the invention. Reference numerals in the diagram are similarly designated as FIG. 1. FIG. 6 shows an example of a configuration when the specific image is recognized by the image formation device. In the example, the drawing command generation unit 11 in the plotted image processor 1 outputs a drawing command described in the PDL or the like to the image formation device 2. The drawing command generation unit 11 in the example performs the process at the time of drawing except for the process of recognizing the specific image in the application program 3 and the printer driver 4 in FIG. 1.

The drawing command sent from the plotted image processor 1 is received by the drawing command input unit 12 and is transferred to the drawing command analysis unit 13. The drawing command analysis unit 13 analyzes the drawing command as described above and sends the result of analyzing the drawing command to both the output image data generation unit 14 and the recognition image data generation unit 17.

The output image data generation unit 14 generates output image data such as a raster image which can be formed by the image formation unit 22 in accordance with the result of analysis of the drawing command in the drawing command analysis unit 13. The generated output image data is once stored in the output image data storage 15 and outputted to the image formation unit 22 and an image is formed on a medium to be recorded such as a sheet of paper.

The recognition image data generation unit 17 also generates recognition image data such as a raster image which is optimum to recognition of the specific image by the recognition unit 18 in accordance with the result of analysis of the drawing command in the drawing command analysis unit 13. In the example, a raster image can also be generated by the output image data generation unit 14. A raster image as the recognition image data is generated so that, for example, resolution, color space, the number of bits per pixel (color and the number of shades), and the like are adapted to the recognition unit 18. Consequently, in many cases, although the raster format is used for the output image data and the recognition image data, different raster images are generated.

In the example of the system, operations substantially the same as those shown in FIG. 2 are performed. In FIG. 2, the output image data in steps S46 and S47 is transferred to the image formation unit 22.

Depending on the specification of the image formation device 2, an image of one page is formed by partial images on the basis of a unit called a strip band. Since the image forming speed of the image formation device 2 in such a system is slow, if output image data of one page is stored and then an image is formed by the image formation unit 22, it would take much time. In many cases, consequently, an operation of generating output image data of one band and transferring the output image data to the image formation unit 22 is repeated. An example of the operation adapted to the image formation device will be described hereinbelow.

Figure 7:
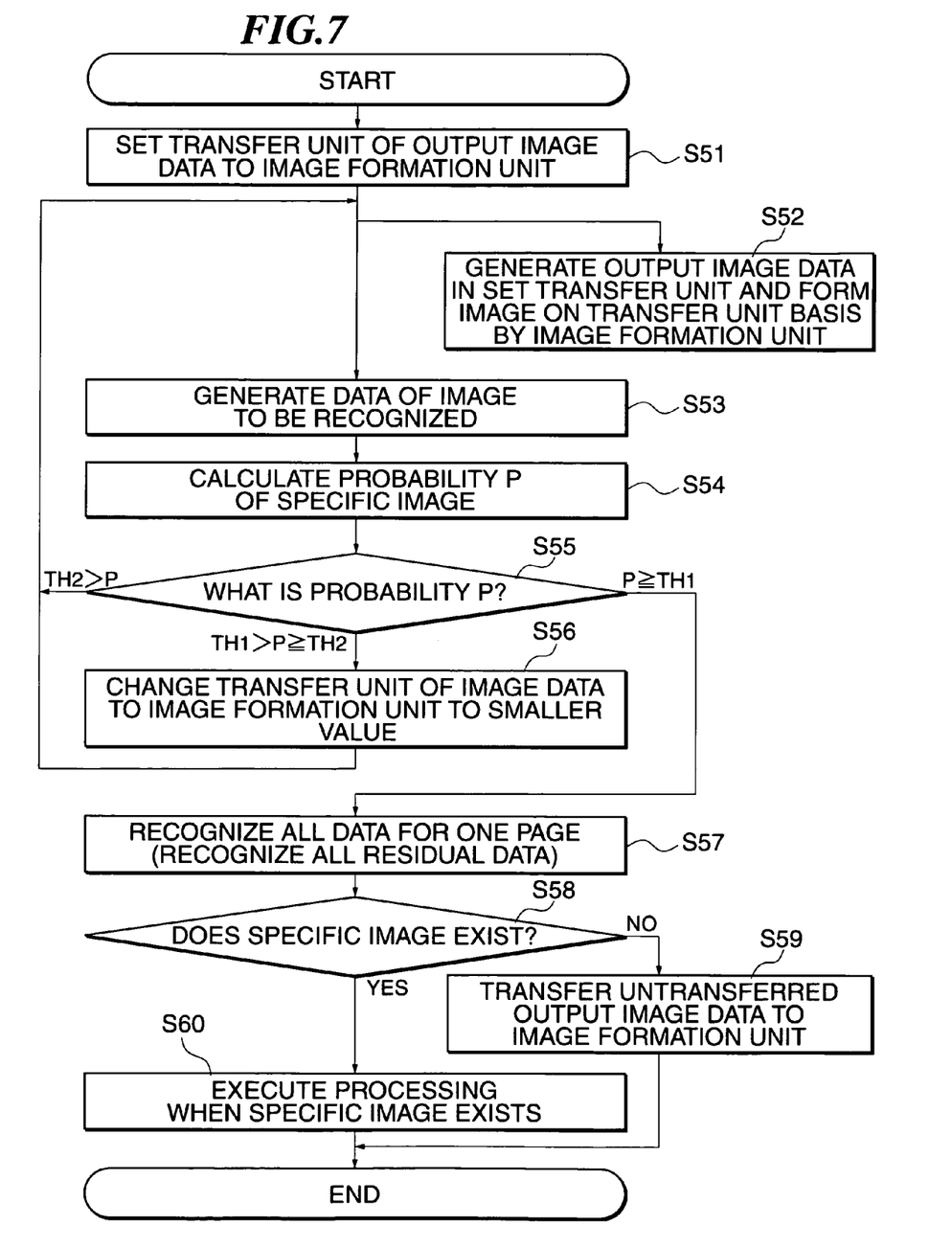
FIG. 7 is a flowchart showing an example of operations in the another example of the image forming system including the embodiment of the invention.

FIG. 7 is a flowchart showing an example of operations in the another example of the image forming system including an embodiment of the invention. In the example, a drawing command is analyzed by the drawing command analysis unit 13 and image data is generated on a band unit basis. The image data of each band is transmitted to the output image data generation unit 14 and also to the recognition image data generation unit 17.

In step S51, a predetermined unit of transferring output image data to the image formation unit 22 is set. In the output image data generation unit 14, in step S52, output image data of the predetermined unit is generated and transferred to the image formation unit 22, and an image of the predetermined unit is formed. In parallel with the operation, in step S53, the recognition image data generation unit 17 generates recognition image data and sends it to the recognition unit 18. In step S54, the recognition unit 18 performs an operation of recognizing a specific image on the recognition image data sent from the recognition image data generation unit 17 and calculates the probability P of the existence of the specific image.

In step S55, the calculated probability P is determined. In the example, the probability P is determined by comparing the probability P with thresholds TH1 and TH2 (TH1>TH2). When the probability P of the existence of the specific image is smaller than the threshold TH2, it is determined that the possibility of the existence of the specific image in the output image data of the predetermined unit (or in an area obtained until then) is low, so that the image forming process is continued.

When the probability P of the existence of the specific image is equal to or larger than the threshold TH2 and is smaller than the threshold TH1, it is determined that there is the possibility that the specific image is included. In step S56, the unit of the output image data to be transferred to the image formation unit 22 is reduced, that is, the image is formed on a smaller unit basis.

In the range of the probability, it is desirable to perform the recognition in consideration of the recognition image data in another transfer unit as well. At the time of calculating the probability P of the existence of the specific image in step S54, for example, new probability P can also be calculated from the probability previously obtained by the recognition process and the probability obtained by the recognition process of this time. Alternately, it is also possible to calculate the probability P of the existence of the specific image by performing the operation of recognizing the specific image by using the accumulated recognition image data sent from the recognition image data generation unit 17 until then. In this case, after the probability P reaches the threshold TH2, the recognition image data may be used as data to be recognized.

When such a recognition process is performed and the probability P of the existence of the specific image becomes smaller than the threshold TH2, the operation is changed back to the regular image forming operation, and image formation can be continued.

When the probability P of the existence of the specific image increases and it is determined in step S55 that the probability P exceeds the threshold TH1, the possibility of the existence of the specific image is regarded as high. The output image data generation unit 14 is once stopped to transfer the output image data to the image formation unit 22. In step S57, recognition image data is generated with respect to the remaining drawing commands and the recognition process by the recognition unit 18 is performed. The result is determined in step S58. When the specific image is not included, in step S59, generation of the output image data to the output image data generation unit 14 and transfer of the output image data to the image formation unit 22 is restarted. When it is determined in step S58 that the specific image is recognized, the process performed when the specific image exists is carried out in step S60. The process performed when the specific image exists is similar to that in step S47 in FIG. 2, that in the description of FIG. 5, and the like.

In such a manner, in the image formation device for forming an image on a predetermined unit basis as well, while forming an image, the recognition process can be performed. Consequently, at the time of forming a regular image, reduction in speed due to the recognition process hardly occurs but an image can be formed at high speed.

In the example of the operations shown in FIG. 7, the probability P is divided into three stages and a control is performed in each of the stages. The invention is not limited to the example, but a control of determining the probability in, for example, two stages or four or more stages and performing the corresponding process may be carried out. The transfer unit may not be changed in step S56 but the transfer of the output image data may be stopped at this time point.

Further, the operation in the case of outputting output image data on the set unit basis as shown in FIG. 7 can be performed similarly in the case where the invention is applied to a printer driver as shown in FIG. 1.

Figure 8:
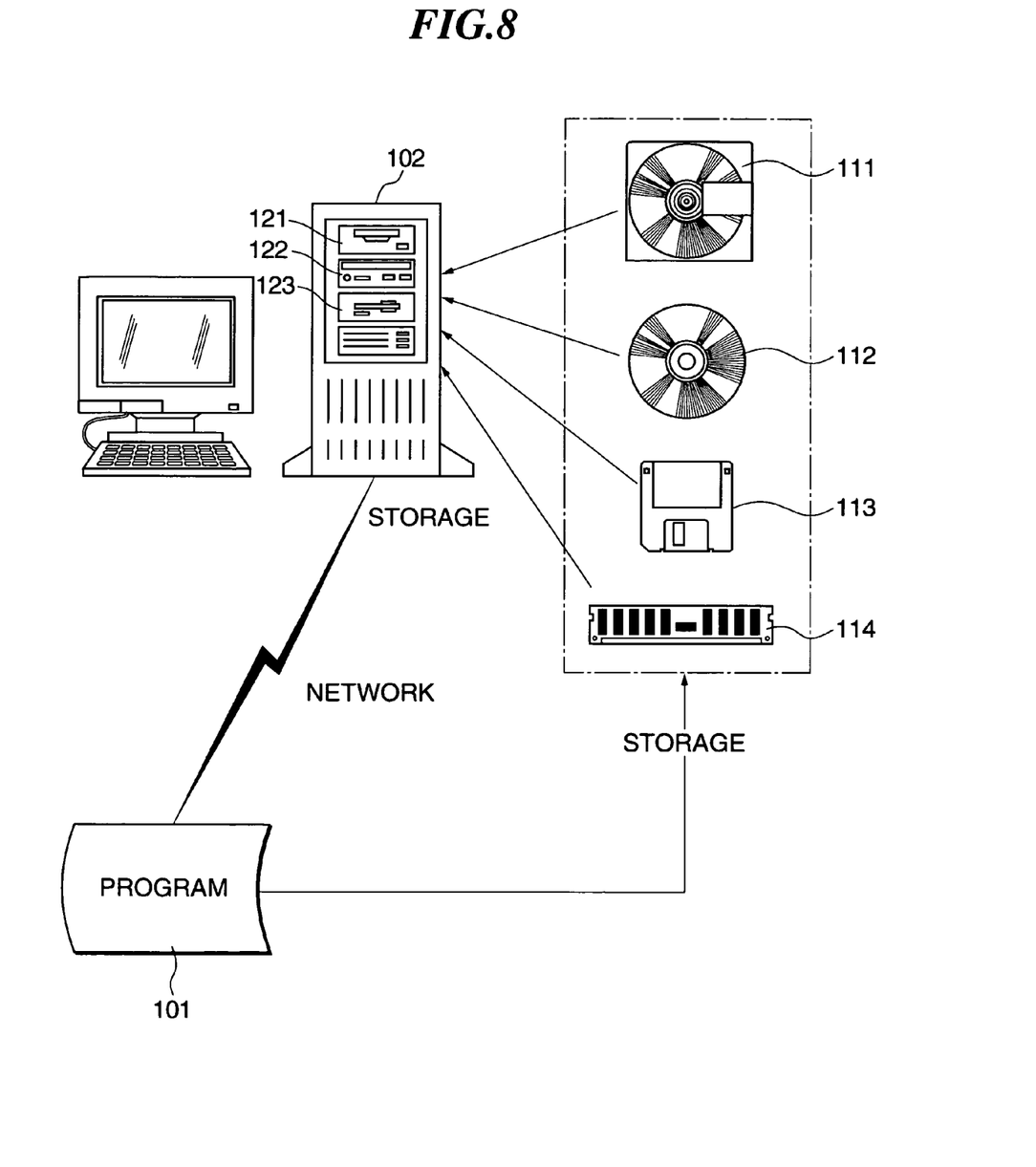
FIG. 8 is an explanatory diagram of an example of a storage medium in which a computer program is stored when the image processing method of the invention is implemented by the computer program.

FIG. 8 is an explanatory diagram of an example of a storage medium in which a computer program implementing the image processing method of the invention is stored. Shown in the diagram are a program 101, a computer 102, a magnetooptic disk 111, an optical disk 112, a magnetic disk 113, a memory 114, a magnetooptic disk drive 121, an optical disk drive 122, and a magnetic disk drive 123.

Each of the foregoing embodiments of the invention can be implemented also by the program 101 which can be executed by a computer. In this case, the program 101 and data used by the program can be stored in a storage medium which can be read by a computer. The storage medium brings about a change state in energy such as magnetism, light, or electricity with respect to a reading apparatus provided for a hardware resource of the computer in accordance with data described in the program and can transmit the data described in the program in the form of a corresponding signal to the reading apparatus. For example, the storage medium is the magnetooptic disk 111, optical disk 112, magnetic disk 113, memory 114 or the like. Obviously, the storage media are not limited to those of a portable type.

The program 101 is stored in the storage medium and the storage medium is loaded into, for example, the magnetooptic disk drive 121, optical disk drive 122, magnetic disk drive 123, or a memory slot (not shown) in the computer 102. The program 101 is read by the computer and the image processing method of the invention can be executed. Alternately, it is also possible to preliminarily insert the storage medium to the computer 102, transfer the program 101 to the computer 102 via a network or the like, store the program 101 to the storage medium, and execute the program 101.

As obviously understood from the above description, according to the invention, the output image data and the recognition image data for recognizing the specific image are generated in parallel, so that the time required only for the recognition process is shortened or eliminated, thereby enabling the high speed image process to be performed. Since the output image data and the recognition image data are generated separately, even when the parameters of the data requested for the output image data and those of the data required for recognition are different from each other, there is no problem. An image optimum to the recognition process can be generated and the recognition process can be performed. For example, the data format, color space, resolution, the number of bits per pixel, and the like of the output image data and those of the recognition image data may be different from each other. Further, since an image optimum to the recognition process is generated, an effect such that a specific image can be recognized with high precision is produced.

The entire disclosure of Japanese Patent Application No. 2000-128485 filed on Apr. 27, 2000 including specification, claims, drawings and abstract is incorporated herein by reference in its entirety.

What is claimed is:

1. An image processing device comprising:
   an output image data generation unit that performs a generation process per partial image to generate output image data from input image data;
   a converting unit that performs a converting process per partial image to convert the input image data into recognition image data; and
   a recognition unit that performs a recognition process per partial image to recognize a specific image from the converted recognition image data,
   wherein, when a possibility that at least the specific image is included is equal to or higher than a predetermined value, the recognition unit performs the recognition process to recognize the specific image on the partial image together with another partial image.

2. An image processing device according to claim 1, wherein a format of the output image data and a format of the recognition image data are different from each other.

3. An image processing device according to claim 1, wherein a color space of an image formed by the output image data and that of an image formed by the recognition image data are different from each other.

4. An image processing device according to claim 1, wherein resolution of an image formed by the output image data and that of an image formed by the recognition image data are different from each other.

5. An image processing device according to claim 1, wherein the number of bits used to represent a pixel in the output image data and that in the recognition image data are different from each other.

6. An image processing device according to claim 1, wherein when the recognition unit recognizes the specific image, the output image data generation unit stops the generation or output of the output image data.

7. An image processing device according to claim 1, wherein when the recognition unit recognizes the specific image, the output image data generation unit stops generation or output of the output image data.

8. An image processing method comprising:
   generating output image data from the input image data;
   converting the input image data into recognition image data; and
   recognizing a specific image by using the converted recognition image data, wherein, generation of the output image data and conversion to the recognition image data are performed per partial image and a process of recognizing the specific image is performed on the recognition image data per partial image such that when a possibility that at least the specific image is included is equal to or higher than a predetermined value, the process of recognizing the specific image is performed on the partial image together with another partial image.

9. An image processing method according to claim 8, wherein a format of the output image data and a format of the recognition image data are different from each other.

10. An image processing method according to claim 8, wherein a color space of an image formed by the output image data and that of an image formed by the recognition image data are different from each other.

11. An image processing method according to claim 8, wherein resolution of an image formed by the output image data and that of an image formed by the recognition image data are different from each other.

12. An image processing method according to claim 8, wherein the number of bits used to represent a pixel in the output image data and that in the recognition image data are different from each other.

13. An image processing method according to claim 8, wherein when the recognition of the specific image is performed by using the recognition image data and the existence of the specific image is recognized, the generation or output of the output image data is stopped.

14. An image processing method according to claim 8, wherein when recognition of the specific image is performed by using the recognition image data and existence of the specific image is recognized, generation or output of the output image data is stopped.

15. A storage medium readable by a computer, the storage medium storing a program of instructions executable by the computer to perform a function for recognizing a specific image from input image data, the function comprising:
  generating output image data from the input image data;
  converting the input image data into recognition image data; and
  recognizing the specific image by using the converted recognition image data,
  wherein, generation of the output image data and conversion to the recognition image data are performed per partial image and a process of recognizing the specific image is performed on the recognition image data per partial image such that when a possibility that at least the specific image is included is equal to or higher than a predetermined value, the process of recognizing the specific image is performed on the partial image together with another partial image.

16. An storage medium according to claim 15, wherein when recognition of the specific image is performed by using the recognition image data and existence of the specific image is recognized, generation or output of the output image data is stopped.

17. A storage medium according to claim 15, wherein when the recognition of the specific image is performed by using the recognition image data and the existence of the specific image is recognized, the generation or output of the output image data is stopped.

18. An image processing device comprising:
  an output image data generation unit that performs a generation process per partial image to generate output image data from input image data;
  a converting unit that performs a converting process per partial image to convert the input image data into recognition image data; and
  a recognition unit that performs a recognition process per partial image to recognize a specific image from the converted recognition image data,
  wherein, when a possibility that at least the specific image is included is equal to or higher than a predetermined value, the process of recognizing the specific image is performed on the partial image together with another partial image, and
  when the recognition unit recognizes the specific image, the generation or transmission of the output image data is stopped.

* * * * *